United States Patent [19]

Pederson

[11] 4,422,413
[45] Dec. 27, 1983

[54] APPARATUS FOR AND METHOD OF PRECISELY UPGRADING PUMP FUEL IN A MOTOR VEHICLE

[75] Inventor: Jeffrey W. Pederson, Thief River Falls, Minn.

[73] Assignee: Met-Con Manufacturing, Olathe, Kans.

[21] Appl. No.: 291,417

[22] Filed: Aug. 10, 1981

[51] Int. Cl.³ .................... F02B 47/00; F02M 43/00; F02D 19/00
[52] U.S. Cl. ................................. 123/25 J; 123/1 A; 123/25 R; 123/25 E; 123/198 A
[58] Field of Search .................. 123/25 R, 25 A, 25 J, 123/25 E, 1 A, 198 A

[56] References Cited

U.S. PATENT DOCUMENTS

| | | | |
|---|---|---|---|
| 2,431,590 | 11/1947 | Smith | 123/25 J |
| 3,490,422 | 1/1970 | Bullis | 123/25 R |
| 3,631,843 | 1/1972 | Yeiser | 123/198 A |
| 4,031,864 | 6/1977 | Crothers | 123/25 A |
| 4,096,829 | 6/1978 | Spears | 123/25 J |
| 4,161,160 | 7/1979 | Hicks et al. | 123/198 A |
| 4,240,380 | 12/1980 | Slagle | 123/25 A |
| 4,364,370 | 12/1982 | Smith et al. | 123/198 A |

*Primary Examiner*—Ira S. Lazarus
*Attorney, Agent, or Firm*—Henry C. Kovar

[57] ABSTRACT

An on-board motor vehicle fuel treatment system for a vehicle having primary and secondary fuel tanks, includes a discrete reservoir for liquid fuel supplement, an electrically powerable constant volumetric displacement pump, a transfer line having a suction line connecting the reservoir to the pump and a delivery line connecting the pump to the tanks, a check valve in each of the suction and delivery lines, a selector valve in the delivery line for normally connecting the pump to the primary tank and alternatively connecting the pump to the secondary tank, a normally open pump switch, an adjustable timer for maintaining the pump switch closed for a duration of time has a timer control for basing time duration on the basis of untreated volumetric units of fuel, and a switch for starting the timer and adjustable time duration for each volumetric unit on the timer control; the timer controlled pump switch is wired in series with the pump and a normally open selector valve switch is wired in series with the pump switch and is parallel with the pump. A method of precisely upgrading pump grade fuel in a motor vehicle includes the steps of presetting a timer for X units of time per singular volumetric quantity, filling a random quantity of fuel into the vehicle, adjusting the timer to the random quantity, initiating operation of the timer, transferring supplement into the fuel at a predetermined volumetric rate per unit of time for a time period determined by the timer, and admixing the supplement into the pump fuel to produce a precisely ratioed and upgraded fuel.

22 Claims, 2 Drawing Figures

4,422,413

APPARATUS FOR AND METHOD OF PRECISELY UPGRADING PUMP FUEL IN A MOTOR VEHICLE

FIELD OF THE INVENTION

This invention pertains to an on-board motor vehicle system for precisely adding a ratioed volumetric quantity of supplement to pump fuel, and to a method of precisely upgrading a random quantity of fuel in a motor vehicle.

BACKGROUND OF THE INVENTION

Use of fuel additives is commonplace. They come under many brand names and are of many types. The common procedures have been to either dump a can in the fuel tank, an example of which is de-icer, or to dump a capful or cupful from a can into a fuel tank.

There has been no precise apparatus or method of upgrading fuel.

In the last eight or so years, particularly since 1973, the quality of pump fuel has been steadily and gradually decreasing. The variation between brands and between geographic locations has also become greater.

Optimal ratios for adding supplements vary considerably, but no apparatus or method has been provided for precise control and optimal use of additives. More often than not, an additive user either adds too much, or not enough.

OBJECTS OF THE INVENTION

It is an object of the present invention to provide an on-board motor vehicle fuel treatment system for adding supplement to fuel based upon the volumetric units of untreated fuel taken on by the vehicle.

It is an object of the present invention to provide an on-board motor vehicle fuel treatment system for adding supplement to untreated fuel that provides for security for the supplement.

It is an object of the present invention to provide an on-board motor vehicle fuel treatment system for adding supplement to untreated fuel, that will prevent dilution of the supplement by the fuel.

It is an object of the present invention to provide an on-board motor vehicle fuel treatment system for adding supplements to untreated fuel, that can treat fuel in more than one tank.

It is an object of the present invention to provide an on-board motor vehicle fuel treatment system for adding supplement to untreated fuel that enables adjustment of the quantity of supplement per volumetric unit of fuel, to various volumetric quantities of untreated fuel.

It is an object of the present invention to provide a method of precisely upgrading a random quantity of fuel in a motor vehicle.

These and further objects of the present invention will become apparent to those versed in the art upon examination of the teachings of the present invention.

SUMMARY OF THE INVENTION

An on-board motor vehicle fuel treatment system for a motor vehicle having a primary fuel tank, has a discrete reservoir for liquid fuel supplement, an electrically powerable pump for pumping supplement at a constant volumetric rate per unit of time, a supplement transfer line having a suction line connecting the reservoir to the pump and a delivery line connecting the pump to the tank, a normally open pump control switch, and a timer connected to the switch and operative to maintain the switch closed for a duration of time has an adjustable timer control with duration of time set based upon volumetric units of untreated fuel, and means for initiating operation of the timer. A method of precisely upgrading pump grade fuel in a motor vehicle includes the steps of pre-setting a time for X unit of time per singular volumetric quantity, filling the vehicle with a recorded random volumetric quantity of pump fuel, adjusting the timer to the recorded random quantity, starting the timer, transferring fuel supplement into the random quantity at a predetermined volumetric rate per unit of time for an undetermined period of time which is determined by the timer, and admixing the supplement into the pump fuel to produce a precisely ratioed upgraded fuel.

DESCRIPTION OF THE PREFERRED EMBODIMENT

Figure 1:
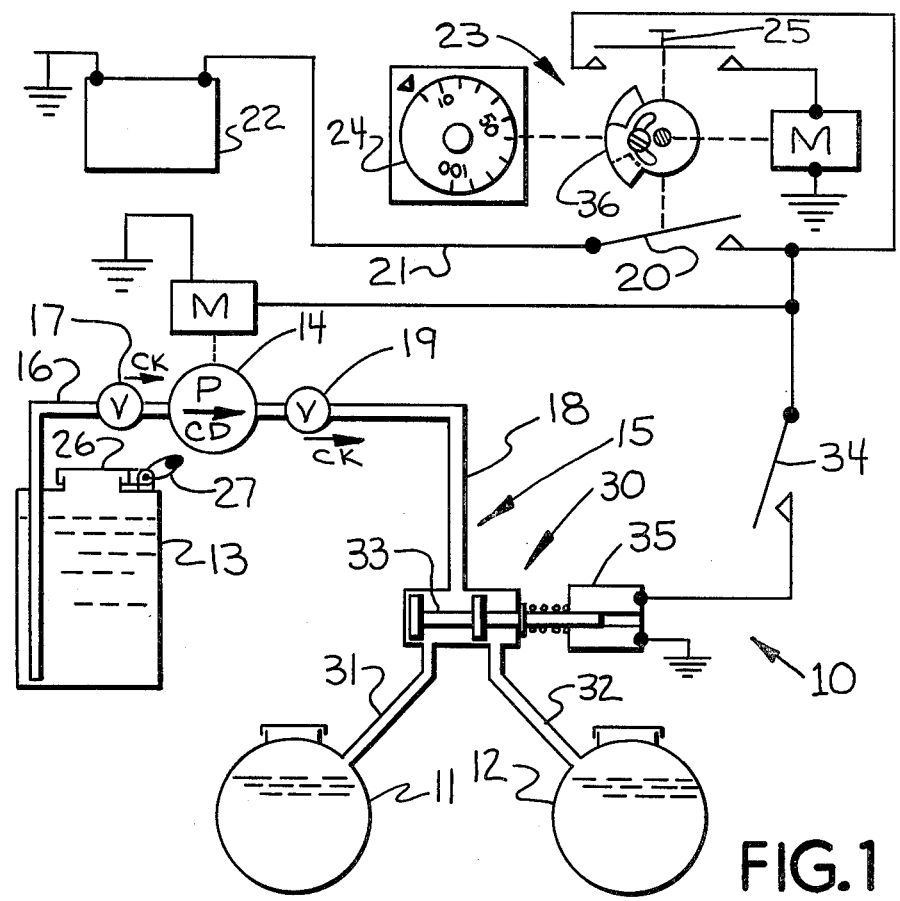
FIG. 1 is a schematic illustration of an on-board motor vehicle fuel treatment system for having a pump for adding supplement in precise ratios to random, but known, quantities of pump fuel.

An on-board motor vehicle fuel treatment system is shown in FIG. 1 and generally indicated by the numeral 10. By the term "on-board" is meant that the system 10 is in and is carried by a movable motor vehicle (not shown), a specific example of which is an over-the-road diesel truck.

The system 10 feeds to a primary vehicle fuel tank 11, and to a secondary fuel tank 12 if carried by a vehicle. The system 10 has a fluidly discrete reservoir 13 for liquid fuel supplement, an electrically powerable supplement transfer pump 14, and a fuel supplement transfer line generally indicated by the numeral 15. The transfer line 15 includes a suction line 16 fluidly connecting the reservoir 13 to an inlet of the pump 14, a check valve 17 in the suction line 16, between the reservoir 13 and the pump 14 for precluding back-flow from the pump 14 to the reservoir 13, and a delivery line 18 to the tanks 11, 12 from an outlet of the pump 14.

The delivery line 18 has a check valve 19 in between the pump 14 and the tanks 11, 12 for precluding reverse flow of fuel from either tank 11, 12 to the pump 14 and ultimately to the reservoir 13.

A normally open pump control switch 20 is in a power lead 21 between a source of electromotive power 22, the vehicle battery for example, and the electrically powerable pump 14. A timer, generally indicated by the numeral 23, is operatively connected to the pump control switch 20. The timer 23 has an adjustable timer control 24 with visual indicia for setting a duration of time based upon random volumetric units of fuel, examples of these units are gallons, liters, and imperial gallons. A momentary contact 25 is provided for initiating operation of the timer 23. Within the timer 23 is an adjustable device 36 for adjustment of a basic unit of time duration of pump switch 20 closing with respect to timer control 24 volumetric set units; the adjustable device 36 shown in FIG. 1 is an adjustable dwell cam, it will be appreciated an adjustable potentiometer is the equivalent in an electronic timer. The adjustment device 36 may have a range of one to three seconds. If this adjustment device 36 is set on one second, and if and when the timer control 24 is turned to fifteen gallons, the switch 20 will be closed for and the pump 14 will run for fifteen seconds. As a second example, if the adjustment device 36 is set for two and one-half seconds, and the timer control 24 is turned to fifty gallons, the switch 20 and pump 14 will be closed and run respectively for one hundred twenty-five seconds.

The electrically powerable pump 14 is of a constant volumetric type and pumps a constant and repetitive volumetric amount of supplement per unit of time. The reservoir 13 has a filling cap 26 securable on and to the reservoir 13 by a tamperproof seal 27 for security of the supplement in the reservoir 13 when a vehicle is on a cross-country trip.

A selector valve, generally indicated by the numeral 30, is in the delivery line 18 for selectively connecting the pump 14 to the tank 11 and/or to the secondary tank 12. The delivery line 18 has discrete outlets 31, 32 downstream of the selector valve 30 to the primary and secondary tanks 11, 12 respectively. The valve 30 connects the pump 14 exclusively to a selected one of the tanks 11, 12 and a spool 33 is utilized to normally connect the pump 14 to the primary tank 11 and to close off the pump 14 to the non-selected tank, which is the secondary tank 12 in FIG. 1. The check valve 19 is between the pump 14 and selector valve 30 for precluding reverse flow from the selector valve 30 to the pump 14. The selector valve 30 is operatively connected to and is under the control of a tank selector switch 34 which is connected to a solenoid 35 of the selector valve 30. The tank selector switch 34 is electrically connected in series with the pump control switch 20, and in parallel with the pump 14.

In this system 10, the supplement reservoir may be located anywhere in the vehicle; it may be above, at the level as, or below the fuel tanks 11, 12.

In operation and use of the system 10 and in the method of the present invention, the reservoir 13 is filled with liquid fuel supplement. Specific examples of fuel supplements are manufactured by Bell Laboratory, Inc. of Orlando, FL, and sold under trademarks MIX-I-GO, DEE-ZOL and ATOM-IX. These additives, when properly and precisely used, change the untreated fuel and lower the flash point and increase the burn rate of diesel fuel, and raise the flash point and decrease the burn rate of gasoline. When properly and precisely used in diesel vehicles, these supplements eliminate water in fuel lines, injector valve troubles, coking nozzles and carbon deposits in and on injection nozzles, and plunger and barrel wear in fuel pumps. In gasoline vehicles, results of about a five percent mileage increase, and a fifteen percent reduction in nitrous oxide emissions have been observed. Valve, valve stem, and piston ring wear is reduced by increasing the lubrication of gasoline, and oil consumption and emissions therefrom are reduced.

It has been found that the volumetric quantity of supplement per volumetric unit of untreated fuel may vary. Break-ins of new engines, clean out of dirty used engines, and abnormally bad fuel require more supplement. A suggested ratio for MIX-I-GO is 2 oz. per 10 gallons of gasoline for break-in or clean out, and 1 oz. per 10 gallons after completion of break-in or clean out. With DEE-ZOL, 2 gallons to 640 gallons of untreated fuel for initial treatment and 16 oz. per 80 gallons thereafter. The timer adjustment device 36 is pre-set to a desired or X constant unit of time per singular unit of volumetric untreated fuel. The vehicle is then filled with a recorded but random volumetric quantity of untreated pump fuel. As an example, the primary tank may be filled with fifty gallons and the secondary tank with thirty-seven gallons. The adjustable timer control 24 is adjusted to "50" (for fifty gallons) and the switch 25 is closed to initiate operation of the timer 23. This timer 23 closes the pump control switch 20 effecting operation of the pump 14 and trnasferring fuel upgrading supplement into the recorded random quantity of fuel at a predetermined volumetric rate per unit of time, for an undetermined period of time which is determined by the so-adjusted timer on the basis of "50" (fifty gallons) times the time constant pre-set into the adjustable timer unit device 36. When the timer 23 completes its cycle, the pump 14 shuts off and a precise volumetric quantity of supplement has been ratioed into this previously untreated pump fuel to provide a precisely upgraded and higher quality fuel.

To treat the fuel in the secondary tank 12, the timer control 24 is turned or set to thirty-seven and the tank selector switch 34 is closed, thereby energizing its solenoid 35 and moving the valve spool 33 and closing outlet 31 and opening outlet 32 to fluidly connect this pump 14 to the secondary tank 12. The start switch 25 is closed and the timer then affects operation of the pump 14 for thirty-seven (37 gallons) times the pre-set adjusted time constant in the adjustable device 36. The supplemental tank 12 may be a saddle tank for a tractor motor, or a tank for a refrigeration motor on a trailer for perishables.

The reservoir 13 is tamperproofly sealed and the vehicle owner is assured his over-the-road driver will not sell the supplement to another independent trucker. The check valves 17, 19 individually and jointly check against flow of pump fuel into the not-yet transferred supplement and the selector valve 30 enables transfer only to a selected one of the tanks 11, 12. The selector switch 34, after being used, opens and the selector valve 30 disconnects and closes the secondary tank 12 and reconnects to the primary tank 11.

A precise, repetitive, operative and economically optimal ratioing of supplement is made to random and unpredictable, but indicatable and recordable, quantities of untreated fuel taken on at fuel stations anywhere, by a transient vehicle having this system 10. The system can be fine tuned with the device 36 to compensate for the vehicles age and/or condition, the ambient conditions the vehicle normally is operated in, or the expected grade of fuel normally used in the vehicle. If substitution of lesser or better grade fuel are made in remote sites, compensation can be easily made.

Figure 2:
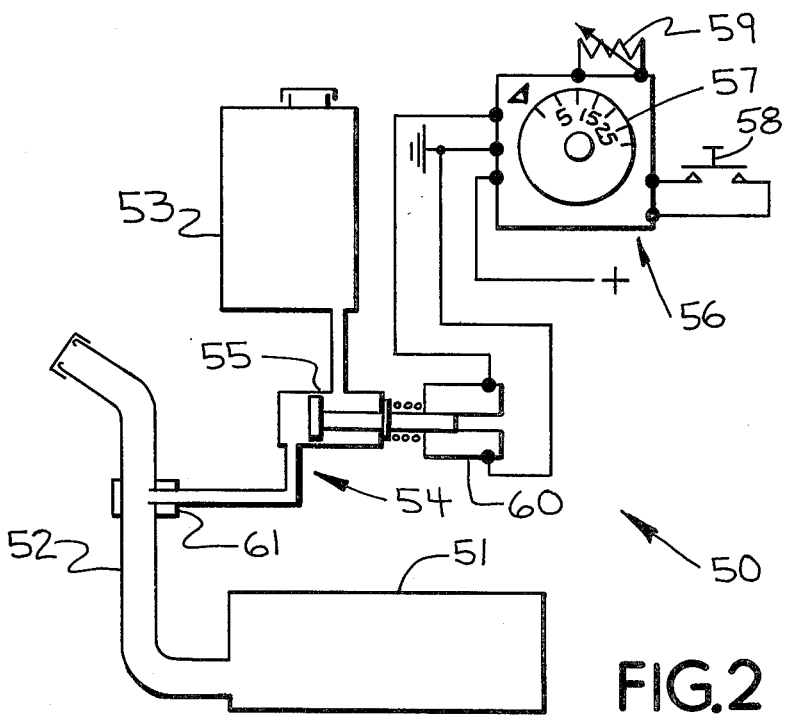
FIG. 2 is a schematic illustration of a lower-cost gravity system for the same purpose.

FIG. 2 illustrates an alternative and less complicated gravity feed fuel treatment system generally indicated by the numeral 50. The gravity feed system 50 is for a vehicle, such as a privately owned automobile having a fuel tank 51 from which extends an upwardly extending fill pipe 52. A discrete supplement reservoir 53 is mounted at a level above the level of the fuel tank 51 and is connected to the tank 51 by a supplement transfer line generally indicated by the numeral 54. The transfer line 54 has a normally closed valve 55 which is connected to and controlled by a timer 56. The timer 56 has an adjustable control device 57, shown to be a dial, but which could be a digital device, which is for setting a duration of time based upon volumetric units of fuel. The adjustable control 57 is settable on the basis of gallons, liters, or some such volumetric units of untreated fuel taken into the tank 51. A momentary contact 58 is provided for starting the timer 56. An adjustable potentiometer 59 is provided in the timer 56 for enabling adjustment of the basic time unit per single volumetric unit of fuel. The timer 56 is the electronic analog of the previously described mechanical timer 23; and these timers 56, 23 function essentially identical. The normally closed valve 55 is an electrically operable valve having a solenoid 60 connected in series with the timer 56 to a source of power. The supplement transfer line 54 is connected to the fill pipe 52 at a level above the level of the fuel tank 51. A preferred connection is by a saddle-valve 61 on the fill pipe. An example of a suitable saddle valve 61 is disclosed in U.S. Pat. No. 3,554,217.

This low-cost system 50 is a gravity feed system and specifically intended to be made available in a do-it-yourself kit for distribution via auto stores and ultimate installation by the vehicle owner. It is of lesser accuracy than the pump pressurized system 10, but suffices for vehicles using lesser quantities of fuel.

In operation of the gravity system 50 the valve 55 is normally closed and nothing happens. When a random quantity of untreated fuel is put into the tank 51, the vehicle owner sets the timer control 57 to the appropriate gallonage and closes the start contact 58. The timer 56 then opens the valve 55 and liquid supplement is transferred by gravity through the transfer line and into the fill pipe 52. The fuel in the tank 51 will slosh around the become admixed with the supplement to upgrade the previously untreated fuel.

Although other advantages will be found and realized and various modifications may be suggested by those versed in the art, be it understood that I wish to embody within the scope of the patent warranted hereon, all such embodiments as reasonably and properly come within the scope of my contribution to the art.

I claim as my invention:

1. An on-board motor vehicle fuel treatment system for a motor vehicle having a primary fuel tank, comprising:
   (a) a discrete reservoir for liquid fuel supplement;
   (b) an electrically powerable pump for pumping liquid supplement at a constant volumetric amount per unit of time from said reservoir to said tank;
   (c) a fuel supplement transfer line having a suction line fluidly connecting said reservoir to an inlet of said pump, and a delivery line connecting an outlet of said pump to said tank;
   (d) a normally open pump control switch in a power lead between a source of electromotive power and said pump; and
   (e) a timer operatively connected to said switch, said timer being operative to maintain said switch closed and to effect operation of said pump for a duration of time, said timer having
      (1) an adjustable timer control having means for setting a duration of time based upon volumetric units of fuel, said control being adjustably settable on the basis of the volumetric units of untreated fuel in said tank, and
      (2) means for initiating operation of said timer.

2. A vehicle fuel treatment system according to claim 1, in which said supplement reservoir includes means for filling of the reservoir, and means for tamper-proof closing of the filling means.

3. A vehicle fuel treatment system according to claim 1, in which said transfer line includes a check valve for precluding reserve flow back to said reservoir, said check valve being fluidly in series with said pump.

4. A vehicle fuel treatment system according to claim 3, including two of said check valves, said check valves being one on each side of said pump.

5. A vehicle fuel treatment system according to claim 1, including a valve in said delivery line for selectively connecting said pump to the tank.

6. A vehicle fuel treatment system according to claim 5, having a second fuel tank, and in which said delivery line has a discrete outlet for each tank, said delivery line valve being a selector valve upstream of the delivery line outlets for selectively connecting said pump exclusively to a selected one of the fuel tanks.

7. A vehicle fuel treatment system according to claim 6, in which the selector valve has means for fluidly closing the delivery line to the non-selected tank.

8. A vehicle fuel treatment system according to either of claims 6 or 7, in which the selector valve normally connects the pump to the primary tank.

9. A vehicle fuel treatment system according to either of claims 6 or 7, including a check valve between the pump and the selector valve, for precluding reverse flow from the selector valve to the pump.

10. A vehicle fuel treatment system according to either of claims 6 or 7, including a tank selector switch operatively connected to said selector valve, said switch being electrically connected in series with said pump control switch, and in parallel with said pump.

11. A vehicle fuel treatment system according to either of claims 1, 6 or 7, in which said timer includes means for adjusting a time duration of pump switch closing with respect to timer control volumetric set units.

12. A fuel treatment system in a motor vehicle having a fuel tank comprising:
   (a) a discrete reservoir for liquid fuel supplement, said reservoir being at a level above the level of the vehicle tank;
   (b) a supplement transfer line connecting the reservoir to the fuel tank;
   (c) a normally closed valve in said transfer line; and
   (d) a timer connected to said valve and operative for opening said valve, said timer having
      (1) an adjustable timer control having means for setting a duration of time based upon volumetric units of fuel, said control being adjustably settable on the basis of the volumetric units of untreated fuel in said tank, and
      (2) means for initiating operating of said timer.

13. A fuel treatment system according to claim 12, in which said valve is an electrically operable solenoid valve connected in series with said timer to a source of electromotive power.

14. A fuel treatment system according to claim 12, in which the transfer line is fluidly connected to a fill pipe extending from said tank.

15. A fuel treatment system according to claim 14, in which a saddle valve on the fill pipe connects the transfer line to the fill pipe.

16. A fuel treatment system according to either of claim 14 or 15, in which the transfer line is connected to the fill pipe at a level above the level of the tank.

17. A method of precisely upgrading pump grade petro fuel in a motor vehicle, comprising the steps of:

(a) pre-setting a timer in the vehicle for X units of time per singular volumetric quantity of fuel;

(b) filling the vehicle fuel tank with a recorded random volumetric quantity of pump fuel;

(c) adjusting the timer to the recorded random volumetric quantity;

(d) initiating operation of the timer;

(e) transferring fuel upgrading supplement into the recorded random volumetric quantity of fuel at a predetermined volumetric rate per unit of time, for an undetermined time period which is ultimately determined by the so-adjusted timer; and (f) intimately admixing the supplement into the pump fuel while in said tank, in a precise predetermined ratio and thereby producing a precisely upgraded fuel.

18. A method according to claim 17, including the step of tamperproofly sealing a reservoir of supplement, from which to draw for upgrading.

19. A method according to either of claims 17 or 18 including the step of checking against flow of pump fuel into not-yet transferred supplement.

20. A method according to claim 17, including the step of selectively transferring supplement into more than one fuel tank, one tank at a time.

21. A method according to either of claims 17 or 20, including the step of normally precluding fluid communication between the supplement and the fuel.

22. An on-board fuel treatment system for a motor vehicle having a primary fuel tank, for precisely adding liquid fuel supplement to a random but recorded quantity of untreated pump fuel taken into said tank, comprising:

(a) a discrete reservoir for liquid fuel supplement;

(b) a fuel supplement transfer line connecting said reservoir to said tank;

(c) means fluidly in said transfer line for normally closing said line; said means being electrically operable for intermittent opening of said line;

(d) A normally open electric control switch wired in series with said means;

(e) a timer connected to said switch, said timer being operative for manipulating said switch closed for effecting opening of said supplement transfer line for a duration of time based upon said quantity; and (f) means for selectively initiating operation of said timer independently of filling of the tank with fuel.

* * * * *